(12) United States Patent
Anaya-Olvera

(10) Patent No.: US 7,510,590 B2
(45) Date of Patent: Mar. 31, 2009

(54) METHOD OF OBTAINING A CONCENTRATE HUMIC EXTRACT FROM ORGANIC AND INORGANIC SOURCES

(75) Inventor: Alejandro Anaya-Olvera, San Juan del Rio (MX)

(73) Assignee: Biotecnologia Organica, S.A. de C.V., Roma Sur (MX)

( * ) Notice: Subject to any disclaimer, the term of this patent is extended or adjusted under 35 U.S.C. 154(b) by 984 days.

(21) Appl. No.: 10/495,422

(22) PCT Filed: Dec. 18, 2001

(86) PCT No.: PCT/MX01/00091

§ 371 (c)(1),
(2), (4) Date: May 20, 2004

(87) PCT Pub. No.: WO03/052028

PCT Pub. Date: Jun. 26, 2003

(65) Prior Publication Data

US 2004/0261481 A1    Dec. 30, 2004

(51) Int. Cl.
*C05F 15/00* (2006.01)
*C05F 9/04* (2006.01)
*C05F 11/02* (2006.01)
*C05F 3/00* (2006.01)

(52) U.S. Cl. .................. 71/11; 71/24; 71/21; 71/14

(58) Field of Classification Search .......... 71/24, 71/58, 59, 21
See application file for complete search history.

(56) References Cited

U.S. PATENT DOCUMENTS

| 3,076,291 A | 2/1963 | Gardner | 47/58 |
| 4,698,090 A * | 10/1987 | Marihart | 71/24 |
| 5,034,045 A * | 7/1991 | Alexander | 71/24 |

FOREIGN PATENT DOCUMENTS

| ES | 2005484 | 3/1989 |
| ES | 2023492 | 1/1992 |
| WO | WO92/16600 | 10/1992 |

OTHER PUBLICATIONS

Stevenson, FJ; Humus Chemistry: Genesis, Composition, Reactions; 1994; John Wiley and Sons; Second Edition; pp. 37, 41-42.*

* cited by examiner

*Primary Examiner*—Melvin Curtis Mayes
*Assistant Examiner*—James Corno
(74) *Attorney, Agent, or Firm*—Jacobson Holman PLLC

(57) ABSTRACT

A process to obtain a humic extract that concentrates features of liquid extracts from mineral and organic sources is provided by first elaborating a humic extract from a first organic source by using an extracting alkaline solution and by utilizing residual alkalinity to partially extract active ingredients from a second mineral source. A product useful to improve cultivation soils and to physiologically activate plants is also provided.

10 Claims, No Drawings

METHOD OF OBTAINING A CONCENTRATE HUMIC EXTRACT FROM ORGANIC AND INORGANIC SOURCES

This is a nationalization of PCT/MX01/00091 filed Dec. 18, 2001 and published in Spanish.

FIELD OF THE INVENTION

This invention relates generally to organic matter regeneration in cultivated soils and more particularly to a process to concentrate features and benefits of fluid extracts of humic substances from organic and mineral sources, in order to obtain a product that is richer in humic substances as compared to those obtained through physical mixtures of existing extracts from organic and mineral sources.

BACKGROUND OF THE INVENTION

Organic matter of soil is one of the most important natural resources. From ancient times, man has recognized that the soil fertility can be maintained or improved by means of organic materials incorporation. Unfortunately, modern practices to handle cultivated soils, as well as irrigation and drainage methods, crop practices and the use of chemical fertilizers have contributed to the exhaustion to such an extent that the presence of organic matter in soils for commercial agriculture has become seriously diminished or nonexistent.

Organic matter in soil is the accumulation of partially decomposed and resynthesized wastes that affect plant nutrition. Organic matter has two main components, humic and non-humic substances. Humic substances constitute 60 to 80% of organic matter in soil and include complex materials that are very resistant to microbial attack. Humic compounds are characterized by their aromatic chains, such as polyphenol and polyquinone, which are very complex structures. These groups are formed by decomposition, synthesis and polymerization. Humic substances do not show clearly defined physical and/or chemical properties; they are amorphous, dark and have high molecular weights from hundreds to thousands. Based on their resistance to degradation and their solubility in acids and alkalis, humic substances have been classified into three chemical groups: (a) fulvic acid, with the lowest molecular weight and lightest color; it is soluble in alkalis and acids and the most susceptible to microbial attack; however, fulvic acid is very stable and more resistant to degradation than other fresh materials recently incorporated; fulvic acid can stay between 15 and 50 years in soil. (b) humic acid with medium color and molecular weight; it is soluble in alkalis and insoluble in acids; it has medium resistance to degradation; (c) humin is the component with highest molecular weight, darkest color, insoluble in alkalis and acids and the most resistant to microbial attack. Usually fulvic acids and humic acids are called "humic acids".

Non-humic substances group constitutes between 20 to 30% of organic matter of soil. These compounds are less complex and less resistant to microbial attack than those in the humic group. Non-humic substances are formed by specific organic compounds with defined physical and chemical properties. Some of these non-humic materials are modified only by microbial action, while others are synthesized as a result of the breakdown of larger chains of substrates. Non-humic group includes polysaccharides, which are especially effective to form stable aggregates in soil, such as polyuronides that are not found in live plants but that are synthesized by soil microorganisms and are components of microbial tissues. Once the microorganism dies, polyuronides are subject to degradation by other microorganisms or to interaction with other soil materials.

Some simple compounds that are part of non-humic groups are some organic acids and materials with protein-like structures. Although these materials are not present in large amounts, they are essential since they affect availability of some plant nutriments such as nitrogen and iron.

Historically, organic matter in cultivation soils has been regenerated through crop rotation, leguminosae planting and tillage with green manure and through application of composts. However, most of these techniques are expensive and time-consuming. Furthermore, current economic pressures prevent farmers from using sustainable cultivation practices. An analysis of this issue suggests that a fast and practical solution is the identification of a reliable source that provides organic matter for its direct application to soil and, if possible, to the plant itself.

There are in the market some extracts of sources rich in organic matter, that have proven useful for commercial agriculture and that are used to increase contents of organic matter in soil and thereby reestablish fertility in a practical way, resulting in benefits such as soil improvement and physiological activation of crops.

These humic extracts, as well as other non-humic extracts, are obtained in soluble form from different sources by means of chemical agents, mainly alkalis. Resulting aqueous solutions are widely commercialized in the agricultural market. A review of the available literature and commercial catalogs indicates that the main source of humic substances' extraction is fossil carbons such as lignite or its derivatives, commonly known as "mineral" sources, and that are soft carbonaceous materials, earth-like, brown to black, and are related to carbon deposits. These sources are characterized by an unusually high content of "humic acids, about 30 to 60%. High content of this source provides fluid extracts with a content in the range of 12 to 18% of solute "humic acids".

Other extraction sources for humic substances are commonly called "organic" and include naturally formed substances, such as peat, which consists of organic matter coming mainly from plant detritus and presumably animal wastes and microorganisms trapped in flooded beds. Included in this type of sources we find induced-formation sources such as compost and worm compost, which are materials resulting from composting process, [i.e. degradation of organic wastes of plants and other organisms that were once alive], by means of controlled biological processes that results in an earthy, dark substance with good physical properties and excellent features as organic mends for soil. In this type of sources, degradation is carried out by microorganism; in the case of the worm composts, degradation is promoted by worms, usually *Eisenia foetida* species, as well as by microorganisms. Concerning mineral sources, solid-state organic sources show low contents of "humic acids", about 10%, and therefore the extract obtained from these sources reaches maximum percentages of 2 to 3%.

In the practice humic extracts have proven to have positive effects over agricultural production, independently from their source. However, both sources have advantages and drawbacks.

Mineral humic extracts are found in an advanced state of decomposition. Biggest changes observed in this type of extracts include loss of carbohydrates, proteins and other biochemical components, as well as increased oxidation of humic materials. This way, unlike soil humus, mineral humic extracts are essentially free from biologically significant compounds such as proteins and polysaccharides.

The virtual absence of proteins and other biochemical nitrogenous compounds indicates that mineral "humic acids" are not proper sources of nitrogen for plant growth. On the other hand, most monosaccharide gums, the most effective soil humus components to form stable aggregates, are not present in mineral humic extracts. Also, due to their high content of carbon and their extremely condensed structures, mineral "humic acids" are easily immobilized in soil even when applied in soluble state. This means that they have less chance to influence plant growth, acting directly as growth regulators.

The most important contribution of mineral "humic acids" in soil fertility is that they enhance ionic exchange ability and neutralization ability. However, they have the disadvantage that their low concentrations of nitrogen and the advanced oxidation state contributes to reduce microbial populations as nutriments are limited and due to the small amount of available energy for decomposition of other organic substrates when mineral extracts are incorporated to soil.

On the other hand, the primary disadvantage of organic source extracts is the relatively low content of "humic acids" that can be obtained from them in the form of liquid or suspension. This increases significantly production and distribution costs of these materials. The low concentration is the major cause for the decreased competitiveness of extracts prepared from organic sources.

However, "humic acids" obtained from organic sources show very important characteristics to stimulate plant growth, since these are carbonated structures less complex than those obtained from mineral sources. This allows them to be easily absorbed by plants. Since these structures come from a recent synthesis, they do not show an advanced oxidation state and therefore they are chemically more active and provide to plants or soil microorganisms with an energy source for their development.

Another advantage of extracts from organic sources is the presence of microbial populations in significant amounts to beneficiate soils when these extracts are applied, thus helping to reestablish or increase beneficial microorganism populations. This feature enhances plant health and reduces risk of diseases, since, when present in soil or in plant surface, the microorganisms contained in extracts compete for growth factors with pathogenic microorganisms. Also, they excrete antibiotics that contribute directly to reduce undesirable microorganism populations. Another important effect of microorganisms is that they contribute to develop soil fertility in a natural way.

Therefore, a need for joining properties of mineral source extracts and organic source extracts still remains unsatisfied. However, currently the properties of both sources are joined through physical mixtures of commercial products. The operation to carry out the physical mixture reduces the content of properties of each one of the products that are mixed, in a determined volume, thus decreasing their properties and effects, and increasing production and commercialization costs.

For example, if a ½ liter of mineral extract with a content of 18% humic substances is mixed with a ½ liter of an organic extract with a content of 3% humic substances a total volume of 1 liter of solution with a content of 10% humic substances will be obtained, which shall only have half the properties and half the effects, as compared to the original volumes.

In accordance with this invention, the inventor has developed a process to concentrate properties of liquid extracts of both generic sources in a determined volume. Surprisingly the extract obtained shows better properties as compared to extracts obtained separately or physically mixed.

SUMMARY OF THE INVENTION

In a first aspect of this invention, a process for preparing an humic extract gathering features and qualities of fluid extracts from mineral and organic sources is provided, by first elaborating a humic extract from a first organic source, for example, by using an alkaline extracting solution, and utilizing the residual alkalinity to partially extract active ingredients from a second source, for example a mineral source.

Due to the particular conditions of the extraction process of the present invention, a chemical combination is very likely to result from the ingredients of the different sources thus obtaining a product with better properties of viscosity, adherence, active ingredient contents and biological effectiveness, which properties clearly distinguish this product from products obtained though physical mixtures existing in the market.

In accordance with another aspect of this invention, a humic extract is provided for with superior properties of viscosity, adherence, content of active ingredients and biological effectiveness, as compared to the commercial products currently offered consisting of physical mixtures of extracts from mineral sources and extracts from organic sources.

It is an object of this invention to provide for a process to prepare a humic extract from mineral and organic sources, in which it is believed that the active components of both sources are chemically combined to provide a product with clearly superior characteristics.

It is also an object of this invention to provide a humic extract from mineral and organic sources with chemically combined active ingredients which in addition to the higher content of active ingredients, shows better viscosity, adherence and biological effectiveness, as compared to the commercial physical mixtures.

Other objects of this invention will become readily apparent from the ensuing description of a preferred embodiment of this invention.

DETAILED DESCRIPTION OF THE PREFERRED EMBODIMENT

In a preferred embodiment of this invention, the process comprises the following steps:

a) obtaining a first humic, alkaline extract from an organic source; and b) utilizing residual alkalinity of the first extract to solubilize active ingredients from a mineral source to obtain a second humic extract.

In a preferred embodiment of this invention, the process comprises an additional step of:

c) strengthening or enrichment of the second humic extract obtained in step (b) with additional nutriments.

To obtain the first humic extract an organic source, such as dry and ground compost, is combined with an alkaline solution of, for example, 0.10 to 0.50 N potassium hydroxide, preferably 0.35 N. in a 1:3-1:7 ratio, more preferably 1:5, of organic source weight:solution volume, with constant agitation and for time enough to extract the largest amount possible of active ingredients from the organic source. Once the active ingredients have been extracted, supernatant is separated; volume separated from the mixture is replaced with water and agitated again for the time necessary to extract the remaining active ingredients. Once the second extraction is performed, supernatant is again separated and mixed with the supernatant obtained from first extraction. Final solution pH should be between 11.5 and 13.5.

To obtain the second extract, alkalinity of first extract is utilized, and active ingredients from a mineral source are dissolve. For this, a mineral source, the first organic extract and a 4.5-6.5 N, preferably 5.8 N, potassium hydroxide solution are mixed at a weight:volume:volume ratio of 1.0:1.0: 0.1-1.0:5.0:1.0, more preferably 1.0:3.0:0.5, respectively. Additions of mineral source and alkaline solution are fractionated so the pH reaches a minimum value of 12.5 and a maximum value of 13.5, and with this the largest extraction of active ingredients is obtained and the lowest damage to microorganism and to chemical structures of compounds is caused.

According to a preferred embodiment, as the alkaline solution a solution of potassium hydroxide is used. However it is to be understood that other alkaline solutions, such as ammonium hydroxide or sodium hydroxide can be used as well.

Due to the complexity of components of organic and mineral humic sources, it is not well determined what really happens under the process conditions of this invention, but it is expected that some kind of chemical combination occurs among the different ingredients of the organic and mineral sources since the properties of the resulting second extract shows enhanced viscosity, adherence and biological effectiveness as compare to those shown by physical mixtures currently in the market.

That is to say, there is a synergy effect through which characteristics and qualities of the resulting extract excel extremely those of liquid extracts from organic and/or mineral sources, both separately and physically combined.

Furthermore, the content of active ingredients in the second extract is larger, per equivalent volume unit, as compared to the currently available commercial physical mixtures.

In an additional aspect of this invention, additional concentrate solutions of potassium hydroxide or scales can be used to further concentrate active ingredients of the mineral source in the second extraction step, following a methodology similar to the above described to avoid excess dilution.

In a further aspect of this invention the second humic extract is subject to an additional step of nutriment enrichment or strengthening using organic or mineral sources thereof.

The process of this invention can be used to concentrate contents of organic matter from organic and mineral sources, and makes possible to maximize properties of different mixtures from organic matter sources, being these organic-mineral, organic-organic, or mineral-mineral sources.

The process of this invention provides for a fluid extract with a high concentration of humic substances and significant amounts of carbohydrates, lipids, proteins, plant growth pseudo-regulators (hormones) and beneficial microorganisms that have direct application to commercial agriculture.

Humic extract obtained from this invention can be used directly as soil amendment or physiological activator and, as mentioned before, it can be enriched with nutriments (common fertilizers) to further maximize effects of each one of the components (humic and non-humic substances and fertilizers) as inputs for plant nutrition, since it is known that organic substances increase availability of nutriments and improve their absorption by plants In an enunciative fashion, the extract obtained by the process of this invention, when contributing with humic and non-humic substances, provides the following benefits, among others, when properly implemented:

Physical Benefits
  Increases humidity retention of soil
  Increases aeration of soil
  Improves soil workability
  Improves seedbed
  Reduces erosion Chemical Benefits
  Increases percentage of total nitrogen in soil
  Neutralizes acid and alkaline soils
  Enhances ionic exchange capability in soil
  Enhances absorption of minerals by plants
  Retains natural fertilizers of soil and those added to soil, and releases them as required by plant.

Biological Benefits
  Accelerates cellular division, thus promoting plant growth
  Enhances thickening of cellular wall, thus extending the shelf life of plant products
  Accelerates seed germination
  Creates a stable environment that promotes development of desirable microorganisms in soil
  Increases vitamin content in plant
  Increases growth of root
  Increases production of enzymes
  Maximizes photosynthesis, and
  Increases tolerance of plants to drought The following example is intended only to further illustrate the invention and is not intended to limit the scope of the invention.

EXAMPLE 1,000 liters of 0.35N potassium hydroxide were added to a 2,000 liters container and were agitated to homogenize solution concentration. 200 kg of dry and ground worm compost were added and agitated again for 8 hours at 60 rpm. Once the extraction was completed, 500 liters of supernatant were separated and added to 500 liters of water into the container. Agitation continued for 8 hours more at the same rpm. Other 500 liters of extract were extracted and mixed with the 500 liters of the first extract with agitation until homogenized.

800 liters of the extract obtained in the previous step were agitated. 75 kg of lignite were slowly added and once the mixture was homogenized, 37.5 liters of 5.8N potassium hydroxide were slowly added. Addition of lignite and potassium hydroxide solution is repeated until addition of a total of 300 kg of lignite and 255 liters of alkaline solution. Mixture was agitated for 12 hours, and then it was let to settle and filtrated.

Resulting product consisted of a fluid with a content of 18% humic substances, carbohydrates, enzymes and microorganism. It was a very viscous fluid with high adherence to soil particles and surface of plant leaves. Application of this product in a 1:100 water dilution provides excellent results to promote plant growth and to improve soil fertility. It can also be used as potentiator for other agrochemical products such as herbicides and foliar fertilizers.

The invention has been described in detail with particular reference to preferred embodiments, but it will be understood that the embodiments are described only as examples. Many modifications can be effected by those skilled in the art to organic and/or mineral sources as well as to alkaline solutions within the spirit and scope of the invention. It is intended that those modifications are included therein provided that they are within the scope of this invention according to the appended claims or equivalents thereof.

The invention claimed is:

1. A process for preparing an enriched extract rich in alkali metal salts of humic acids from various sources of humic substances for modifying and improving plant growing as said enriched extract comprises the most possible characteristics of each source in one single enriched extract, which process comprises the steps of:
- a) obtaining a first alkaline extract by combining a first source of humic substances selected from the group of organic sources consisting of peat, manure, compost and worm compost; or from the group of mineral sources consisting of leonardite and other lignite-type fossil carbons and derivatives thereof, with an alkaline solution with agitation and for time sufficient to extract active ingredients of the first selected source and with an alkalinity sufficient for keeping in solution all soluble ingredients;
- b) separating resulting extract and replacing it with water, repeating the process, collecting the obtained extracts once separated them from the insoluble materials;
- c) adding to these first extracts, with constant agitation, a second source of humic substances different from the first source, selected from the group of organic sources consisting of peat, manure, compost and worm compost; or from the group of mineral sources consisting of leonardite and other lignite-type fossil carbons and derivatives thereof, together with another alkaline solution in order to obtain an enriched extract having alkali metal salts of humic acids from both first and second sources; and
- d) wherein residual alkalinity of the first extract is used together with said other alkaline solution for obtaining the enriched extract.

2. The process of claim 1 wherein the first source of humic substances from which the first extract is obtained is selected from the group of organic sources consisting of peat, manure, compost and worm compost; and wherein the second source of humic substances from which the enriched extract is obtained is selected from the group of mineral sources consisting of leonardite and other lignite-type fossil carbons and derivatives thereof.

3. The process of claim 2 wherein when obtaining the enriched extract a more concentrated alkaline solution or a concentrated solid alkali metal hydroxide is used, and wherein the enriched extract is further enriched with additional nutriments.

4. An enriched extract produced in accordance with the process of claim 3.

5. The process of claim 1 wherein the first source of humic substances from which the first extract is obtained is selected from the group of mineral sources consisting of leonardite and other lignite-type fossil carbons and derivatives thereof; and wherein the second source of humic substances from which the enriched extract is obtained is selected from the group of organic sources consisting of peat, manure, compost and worm compost.

6. An enriched extract produced in accordance with the process of claim 5.

7. The process of claim 1 wherein the first and second source of humic substances are selected both from the group of mineral sources consisting of leonardite and other lignite-type fossil carbons and derivatives thereof.

8. An enriched extract produced in accordance with the process of claim 7.

9. The process of claim 1 wherein the first and second sources of humic substances are selected both from the group of organic sources consisting of peat, manure, compost and worm compost.

10. An enriched extract produced in accordance with the process of claim 9.

* * * * *